US009002133B2

(12) United States Patent
Seo et al.

(10) Patent No.: US 9,002,133 B2
(45) Date of Patent: Apr. 7, 2015

(54) MULTI LAYERED IMAGE ENHANCEMENT TECHNIQUE

(71) Applicant: Sharp Laboratories of America, Inc., Camas, WA (US)

(72) Inventors: Hae-Jong Seo, San Jose, CA (US); Christopher A. Segall, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 143 days.

(21) Appl. No.: 13/778,598

(22) Filed: Feb. 27, 2013

(65) Prior Publication Data

US 2014/0241646 A1 Aug. 28, 2014

(51) Int. Cl.
*G06T 5/00* (2006.01)
(52) U.S. Cl.
CPC ...................................... *G06T 5/002* (2013.01)
(58) Field of Classification Search
CPC ................................. G06T 5/00; G06T 5/001
USPC .......................... 382/264, 131, 128, 275, 262
See application file for complete search history.

(56) References Cited

U.S. PATENT DOCUMENTS

| 4,603,430 | A | * | 7/1986 | Sacks ............................. 382/206 |
| 5,512,956 | A | * | 4/1996 | Yan ............................... 348/606 |
| 7,599,464 | B2 | * | 10/2009 | Raupach et al. .................. 378/4 |
| 7,961,969 | B2 | * | 6/2011 | Findlay et al. ................. 382/255 |
| 8,081,836 | B2 | * | 12/2011 | Porikli .......................... 382/261 |
| RE43,360 | E | | 5/2012 | Demos |
| 8,369,642 | B2 | * | 2/2013 | Findlay et al. ................. 382/255 |
| 2004/0081340 | A1 | * | 4/2004 | Hashimoto .................... 382/128 |
| 2004/0190788 | A1 | * | 9/2004 | Imafuku et al. ............... 382/261 |
| 2008/0131018 | A1 | * | 6/2008 | Findlay et al. ................. 382/255 |
| 2010/0272340 | A1 | * | 10/2010 | Bar-Aviv et al. .............. 382/131 |
| 2012/0062474 | A1 | * | 3/2012 | Weishaupt et al. ........... 345/173 |

FOREIGN PATENT DOCUMENTS

EP         0539653 A2 *   5/1993   ............. G06F 15/70

OTHER PUBLICATIONS

Z. Farbman et al., "Edge-Preserving Decompositions for Multi-Scale Tone and Detail Manipulation," ACM Transactions on Graphics 27(3) (Proc. ACM SIGGRAPH 2008), Aug. 2008, 10 pgs.

(Continued)

*Primary Examiner* — Mekone Bekele
(74) *Attorney, Agent, or Firm* — Chernoff Vilhauer McClung & Stenzel, LLP

(57) ABSTRACT

A system for enhancing an input image including receiving an input image and filtering the input image with a plurality of non-linear smoothing filters providing a respective plurality of filtered outputs. The system processes a plurality of the filtered outputs with respect to at least one of another of the filtered outputs and the input image to determine a plurality of detail layers. The system filters the plurality of detail layers with a plurality of non-linear smoothing filters providing a respective plurality of smoothed layers. The system adjusts the plurality of smoothed layers in such a manner that regions closer to an edge are enhanced to a lesser extent than regions farther from an edge and combining the adjusted the smoothed layers to provide an enhanced output image.

18 Claims, 3 Drawing Sheets

(56) References Cited

OTHER PUBLICATIONS

K. He et al., "Guided Image Filtering," The 11th European Conference on Computer Vision (ECCV), 2010, 14 pgs.

C. Tomasi et al., "Bilateral Filtering for Gray and Color Images," IEEE International Conference on Computer Vision, 1998, 8 pgs.

H. Takeda et al., "Kernel Regression for Image Processing and Reconstructions," IEEE Transactions on Image Processing, vol. 16, No. 2, Feb. 2007, pp. 349-366.

A. Buades et al., "A Review of Image Denoising Algorithms, with a New One," Multiscale Modeling and Simulation (SIAM Interdisciplinary journal), vol. 4, No. 2, 2005, pp. 490-530.

* cited by examiner

MULTI LAYERED IMAGE ENHANCEMENT TECHNIQUE

CROSS-REFERENCE TO RELATED APPLICATIONS

None.

BACKGROUND OF THE INVENTION

The present invention relates generally to a multi-layered image enhancement technique.

A multitude of different techniques have been developed for processing and filtering two-dimensional images and two-dimensional video sequences. In particular, many image processing techniques have been developed to modify a relatively low resolution image to a relatively high resolution image or otherwise enhancing the existing resolution, while maintaining image clarity without the introduction of excessive artifacts.

If an image is blurred or degraded by a well-understood process, such as shot noise occurring during transmission, the image can usually be enhanced by developing a model of the source of degradation, then reconstructing the original image using the model. However, in many circumstances, a source of degradation of the image cannot be modeled and, hence, the image cannot be faithfully reconstructed. Thus, generic image enhancement is problematic since the type of noise content therein may be hard to determine or otherwise characterize.

What is desired therefore is a multi-stage non-linear enhancement technique that is suitable for a variety of different types of noise content.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

Figure 1:
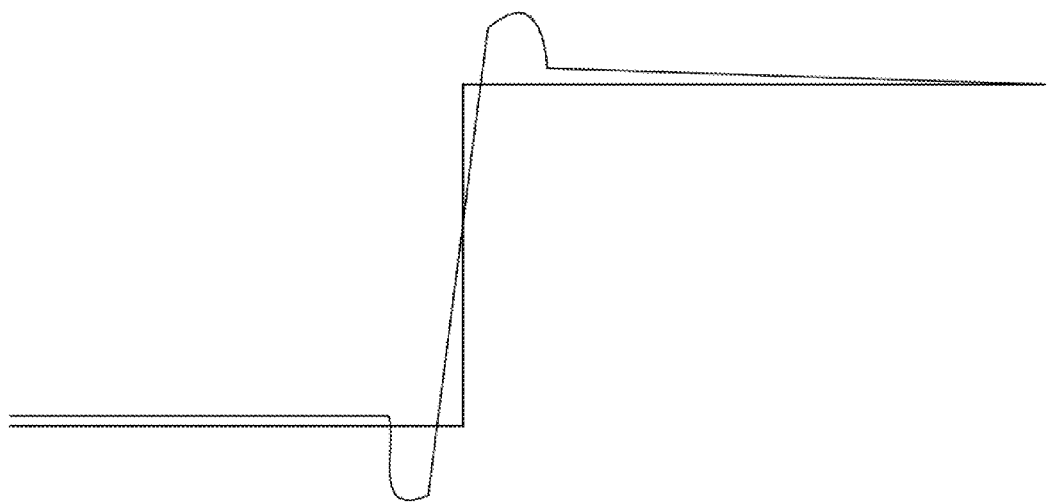
FIG. 1 illustrates an overshoot at an edge region.

Referring to FIG. 1, when an image enhancement technique processes an edge based region illustrated by the step like function often the sharp transitions of the edges results in an overshoot in the resulting enhanced image. The overshoot tends to become even more pronounced when the image enhancement technique attempts to significantly enhance the image. When using non-linear enhancement techniques the likelihood of introducing significant overshoot tends to become more likely. Avoiding the introduction of substantial overshoot, particularly along edge regions of the image, permits the image enhancement technique to introduce additional enhancement that would have otherwise resulted in significant image artifacts. Moreover, the technique should be computationally efficient so that it may be applied to image content in real time without significant computational resources, even when using a non-linear enhancement technique.

Figure 2:
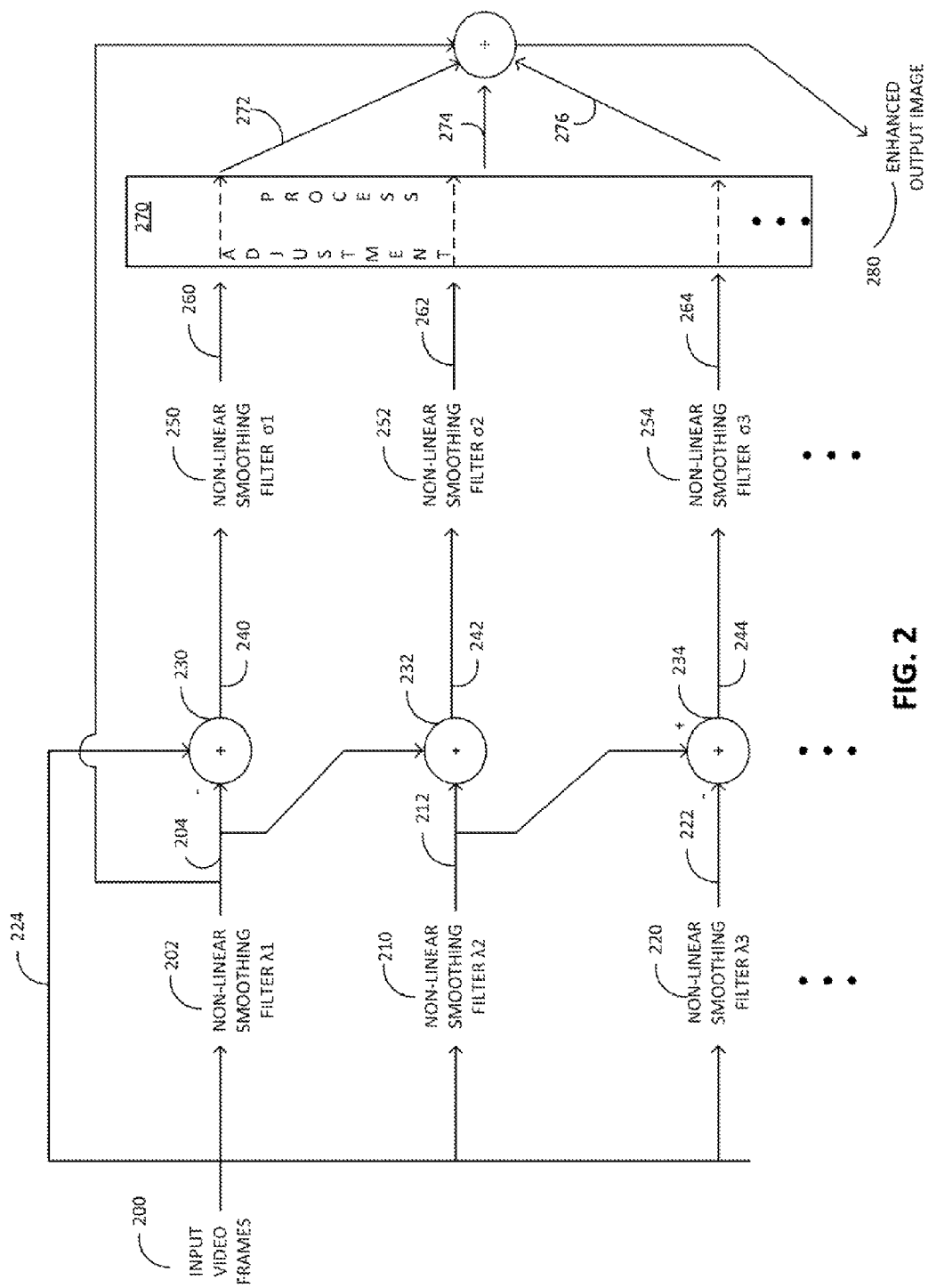
FIG. 2 illustrates an exemplary multi-stage non-linear enhancement technique.

Referring to FIG. 2, an exemplary multi-channel image detail enhancement technique is illustrated. A series of video input frames 200 are provided to the image detail enhancement technique. If desired, the system is likewise applicable for the enhancement of a single input image rather than a series of images.

The input frame 200 is provided to a non-linear smoothing filter $\lambda 1$ 202. As a general matter, non-linear filters tend to be more effective than linear filters, but likewise non-linear filters tend to be more destructive than linear filters if not suitably controlled. The non-linear smoothing filter $\lambda 1$ 202 is suitable to reduce the amount of noise in the image. Preferably, the non-linear smoothing filter $\lambda 1$ is suitable to reduce limited levels of noise in the image, which is suitable for image content that has quite limited amounts of noise. In this manner, the image content is not significantly degraded as a result of the application of the non-linear smoothing filter $\lambda 1$ for image content with quite limited amounts of noise. The non-linear smoothing filter $\lambda 1$ provides an output base layer $\lambda 1$ 204 which is the result of the smoothing filter.

The input frame 200 is provided to a non-linear smoothing filter $\lambda 2$ 210. The non-linear smoothing filter $\lambda 2$ 210 is suitable to reduce the amount of noise in the image. Preferably, the non-linear smoothing filter $\lambda 2$ is suitable to reduce medium levels of noise in the image, which is suitable for image content that has texture based amounts of noise which is a greater amount of noise than the quite limited amounts of noise. In this manner, the image content is not significantly degraded as a result of the application of the non-linear smoothing filter $\lambda 2$ for image content with texture based amounts of noise. The non-linear smoothing filter $\lambda 2$ provides an output base layer $\lambda 2$ 212 which is the result of the smoothing filter.

The input frame 200 is provided to a non-linear smoothing filter $\lambda 3$ 220. The non-linear smoothing filter $\lambda 3$ 220 is suitable to reduce the amount of noise in the image. Preferably, the non-linear smoothing filter $\lambda 3$ is suitable to reduce significant levels of noise in the image, which is suitable for image content that has significant amounts of noise which is a greater amount of noise than the quite limited amounts of noise and a greater amount of noise than the texture based amounts of noise. In this manner, the image content is not as significantly degraded as a result of the application of the non-linear smoothing filter $\lambda 3$ for image content with such significant amounts of noise. The non-linear smoothing filter $\lambda 3$ provides an output base layer $\lambda 3$ 222 which is the result of the smoothing filter. For example, the output base layer $\lambda 3$ 222 may resemble a cartoon image.

The input frame 200 may bypass 224 the non-linear smoothing filters 202, 210, 220. In this manner, a reference image is maintained that does not have any (or an insignificant amount) of filtering applied thereto. In this manner, the image content is not degraded (or insignificantly degraded) as a result of the application of one of the non-linear smoothing filters.

Additional non-linear smoothing filters $\lambda n$ may be included that have different amounts of noise removal, as desired. One or more linear filters may be included, if desired. As it may be observed, each of the different non-linear smoothing filters provides a different amount of smoothing to the same input frame 200. In this manner, the system has available to it a set of output images that have different amounts of smoothing applied thereto, without having to pre-process the image content to determine which particular smoothing filter should be applied at the exclusion of other smoothing filters. In addition, the arrangement of a plurality of different non-linear smoothing filters, each processing the same video frame during overlapping time periods, is suitable for parallel processing.

It is desirable to determine the amount of smoothing that was applied by each smoothing filter. In particular, it is desirable to determine the amount of smoothing that was applied by a particular non-linear smoothing filter relative to one or more of the other non-linear smoothing filters and/or the original input image.

To determine the amount of smoothing applied to the input frame 224 with respect to the output 204 of the non-linear smoothing filter $\lambda 1$ 202 may be determined by using a subtraction operation 230. The output of the subtraction operation 230 is a detail layer 1 image 240. The detail layer 1 image 240 includes the differences between the input frame 224 and the output 204 of the non-linear smoothing filter $\lambda 1$ 202.

To determine the amount of smoothing applied to the input frame 224 with respect to the output 212 of the non-linear smoothing filter $\lambda 2$ 210 may be determined by using a subtraction operation 232. The output of the subtraction operation 232 is a detail layer 2 image 242. The detail layer 2 image 242 includes the differences between the output 204 of the non-linear smoothing filter $\lambda 1$ 202 and the output 212 of the non-linear smoothing filter $\lambda 2$ 210.

To determine the amount of smoothing applied to the input frame 224 with respect to the output 222 of the non-linear smoothing filter $\lambda 3$ 220 may be determined by using a subtraction operation 234. The output of the subtraction operation 234 is a detail layer 3 image 244. The detail layer 3 image 244 includes the differences between the output 222 of the non-linear smoothing filter $\lambda 3$ 220 and the output 212 of the non-linear smoothing filter $\lambda 2$ 210.

Additional comparisons may be included relative to different images, combinations of images, filtered and non-filtered images, as desired. As it may be observed, each of the different subtraction operations 230, 232, 235, identifies a different amount of noise that was removed as a result of one or more non-linear smoothing filters. Thus, the technique indicates different amounts of noise that exists as a result of different amounts of applied smoothing. In this manner, the system has available to it a set of output images indicating the effects of the different amounts of smoothing applied thereto, without having to pre-process the image content to determine a particular smoothing filter to be applied at the exclusion of other smoothing filters. In addition, the arrangement of a plurality of different non-linear smoothing filters, each using the same input frame, is suitable for parallel processing. Also, the arrangement of a plurality of different subtraction operations, each using a different sets of input, are suitable for parallel processing, and at least partially temporally overlapping processing for the same input frame. Additional subtraction operations (or otherwise) may be included, if desired.

The detail layer 1 image 240 may be provided to a non-linear smoothing filter $\sigma 1$ 250. The non-linear smoothing filter $\sigma 1$ 250 reduces the noise in the resulting detail layer 1 based upon the image content, noise levels, etc. The output of the non-linear smoothing filter $\sigma 1$ 250 is a smoothed layer 1 260.

The detail layer 2 image 242 may be provided to a non-linear smoothing filter $\sigma 2$ 252. The non-linear smoothing filter $\sigma 2$ 252 reduces the noise in the resulting detail layer 2 based upon the image content, noise levels, etc. The output of the non-linear smoothing filter $\sigma 2$ 252 is a smoothed layer 2 262.

The detail layer 3 image 244 may be provided to a non-linear smoothing filter $\sigma 3$ 254. The non-linear smoothing filter $\sigma 3$ 254 reduces the noise in the resulting detail layer 3 based upon the image content, noise levels, etc. The output of the non-linear smoothing filter $\sigma 3$ 254 is a smoothed layer 3 264.

The non-linear smoothing filters 250, 252, and 254 are preferably different filters suitable for the corresponding non-linear smoothing filters 202, 210, and 220. In some cases, the non-linear smoothing filters 250, 252, and 254 are the same filter. The non-linear smoothing filters an are suitable for parallel processing, where the same input image may be at least partially be temporally processed in parallel. Additional non-linear smoothing filters may be included, if desired.

The output of the non-linear smoothing filters 250, 252, 254 may be provided to an adjustment process 270. The adjustment process 270 may be, for example, a gamma correction. The adjustment process 270 may result in a noise reduction because primarily (or substantially) only the residual noise content is being adjusted. For example, the adjustment process 270 may selectively not amplify smaller values to the same extent as larger values. In addition, adjustment of the residual noise facilitates selective limiting the amount of the enhancement so that a suitable multiplier can be limited for stronger details to reduce the effects of clipping. The adjustment process 270 may provide the same adjustment to each of the outputs of the non-linear smoothing filters 250, 252, and 254 or it may be different for one or more of such outputs.

The output of the adjustment process 270 may be corresponding adjusted images 272, 274, 276 for each of the input images 260, 262, 264. With each of the adjusted images 272, 274, 276 being a portion of the original input frame 200 they may be summed together to provide the noise related image content that was subtracted from the original input frame 200. In addition, the output of the non-linear smoothing filter $\lambda 1$ 204 is also added to the output of the adjustment process 270 to provide an enhanced output image 280.

Any suitable filer or a selection of different filters may be used for the non-linear smoothing filters 202, 210, 220. For example, the non-linear smoothing filters may be a bilateral filter, a weighted least square filter, and/or a guided filter. In general, the filters preferably reduce the modification of image content near an edge relative to areas that are not as near to such an edge. In this manner, the output of the adjustment process 270 near an edge is small or near zero since there is limited need for changes in regions proximate an edge. Thus for regions near an edge the output of the adjustment process 270 is zero or otherwise near zero and therefore the adjustment process 270 will not significantly boost such edges. Without excessively boosted edges the overshooting problem near edges will not substantially occur.

The preferred implementation of the system uses a 1-dimensional operation on the image content.

Figure 3:
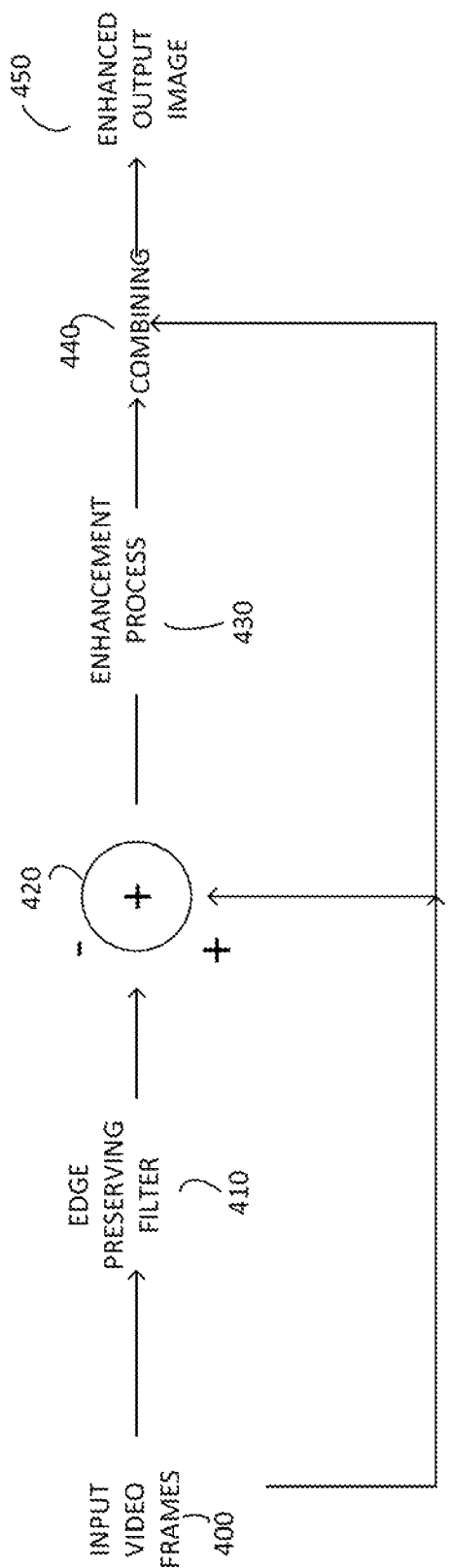
FIG. 3 illustrates another multi-stage non-linear enhancement technique.

Referring to FIG. 3, a modified technique includes receiving input video frames 400. An edge preserving filter 410 may receive each input frame 400. Preferably, the edge preserving filter 410 is a single channel filter. The edge preserving filter 410 attenuates the image to a greater extent in regions that are not proximate an edge than in the regions proximate the edge. Therefore, the non-edge regions of the image tend to be small or otherwise zero. The modified technique determines the difference 420 between the input frame 400 and the edge preserving filter 410. The result of the difference 420 is to provide a difference frame where the edge regions of the image are small or otherwise zero. Since the edge regions are typically those that would otherwise result in undesirable artifacts if boosted, the attenuation of the edge regions reduces the likelihood of such artifacts during subsequent processing. The output of the difference 420 is enhanced by an enhancement process 430. For example, the enhancement process may multiple the values by a value or by a linear and/or non-linear function. The enhancement process 430 may further be modified by a user input, if desired. The enhancement process 430 may be based upon the content of the image, if desired. Preferably, the enhancement process 430 is not based upon the content of the image to determine the filtering to be applied. The output of the enhancement process 430 is combined 440 with the input frame 400. The combination 440 may be a summation process, if desired. The output of the combination 440 is the enhanced output image 450.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for enhancing an input image comprising:
   (a) receiving an input image;
   (b) filtering said input image with a first non-linear smoothing filter to provide a first filtered output;
   (c) filtering said input image with a second non-linear smoothing filter to provide a second filtered output;
   (d) filtering said input image with a third non-linear smoothing filter to provide a third filtered output;
   (e) processing said input image and said first filtered output to determine a first detail layer;
   (f) processing said first filtered output and said second filtered output to determine a second detail layer;
   (g) processing said second filtered output and said third filtered output to determine a third detail layer;
   (h) filtering first detail layer with a fourth non-linear smoothing filter to provide a first smoothed layer based upon the content of said first detail layer;
   (i) filtering said second detail layer with a fifth non-linear smoothing filter to provide a second smoothed layer based upon the content of said first detail layer;
   (j) filtering said third detail layer with a sixth non-linear smoothing filter to provide a third smoothed layer based upon the content of said first detail layer;
   (k) adjusting said first, second, and third smoothed layers in such a manner that regions closer to an edge are enhanced to a lesser extent than regions farther from an edge;
   (l) combining said adjusted said first, second, and third smoothed layers to provide an enhanced output image.

2. The method of claim 1 wherein said first, second, and third non-linear smoothing filters have an increasing amount of filtering.

3. The method of claim 2 wherein said processing of (1) said input image and said first filtered output is a difference operation, (2) said first filtered output and said second filtered output is a difference operation, and (3) said second filtered output and said third filtered output is a difference operation.

4. The method of claim 3 wherein said first smoothed layer, said second smoothed layer, and said third smoothed layer have an increasingly amount of smoothness applied with respect to said input image.

5. The method of claim 4 wherein said adjusting is a gamma process.

6. The method of claim 5 wherein said combining is a summing operation.

7. The method of claim 6 wherein said fourth, fifth, and sixth non-linear smoothing filters are the same filter.

8. The method of claim 1 wherein said filtering said input image with said first, second, and third non-linear filters is performed in a parallel manner.

9. The method of claim 1 wherein (1) said processing said input image and said first filtered output to determine said first detail layer, (2) said processing said first filtered output and said second filtered output to determine said second detail layer, and (3) said processing said second filtered output and said third filtered output to determine said third detail layer is performed in a parallel manner.

10. The method of claim 1 wherein said filtering said input image with said fourth, fifth, and sixth non-linear filters is performed in a parallel manner.

11. The method of claim 1 wherein said combining said first, second, and third smoothed layers further includes said first filtered output to provide said enhanced output image.

12. A method for enhancing an input image comprising:
    (a) receiving an input image;
    (b) filtering said input image with a plurality of non-linear smoothing filters, where each of said plurality of non-linear smoothing filters has a different non-linear function, providing a respective plurality of filtered outputs each of which is based upon a different one of said plurality of non-linear smoothing filters;
    (c) processing one of said filtered outputs with respect to said input image that has not been filtered by one of said plurality of non-linear smoothing filters to determine a first detail layer, and processing each of a plurality of other said filtered outputs with respect to at least one of another of said filtered outputs to determine a plurality of other detail layers;
    (d) filtering said plurality of detail layers with a plurality of other non-linear smoothing filters, where each of said plurality of other non-linear smoothing filters has a different non-linear function, providing a respective plurality of smoothed layers;
    (e) adjusting said plurality of smoothed layers in such a manner that regions closer to an edge are enhanced to a lesser extent than regions farther from an edge;
    (f) combining said adjusted said smoothed layers to provide an enhanced output image.

13. The method of claim 12 wherein said filtering said input image with said plurality of non-linear smoothing filters providing said respective plurality of filtered outputs have an increasing amount of filtering.

14. The method of claim 13 wherein said processing is a difference operation.

15. The method of claim 14 wherein said plurality of smoothed layers have an increasingly amount of smoothness applied with respect to said input image.

16. The method of claim 15 wherein said adjusting is a gamma process.

17. The method of claim 16 wherein said combining is a summing operation.

18. The method of claim 12 wherein said combining smoothed layers further includes one of said first filtered outputs to provide said enhanced output image.

* * * * *